United States Patent                                                            [11] 3,609,038

| | | |
|---|---|---|
| [72] | Inventor | Hajo A. Kolshorn<br>Marietta, Ohio |
| [21] | Appl. No. | 17,391 |
| [22] | Filed | Mar. 9, 1970 |
| [45] | Patented | Sept. 28, 1971 |
| [73] | Assignee | Sperry Rand Corporation<br>New York, N.Y. |

[54] ELECTRONIC CONTROL APPARATUS
10 Claims, 4 Drawing Figs.

[52] U.S. Cl.................................................. 355/68,
355/38, 355/69, 315/151, 250/205
[50] Field of Search............................................ 355/37, 38,
68, 69, 70; 315/151; 250/205

[56] References Cited
UNITED STATES PATENTS
3,279,312  10/1966  Rogers ......................... 355/68 X
3,492,071   1/1970  Limnios et al. ................ 355/69 X

*Primary Examiner*—Samuel S. Matthews
*Assistant Examiner*—M. L. Gellner
*Attorneys*—Frank A. Seemar, Marshall M. Truex and Thomas P. Murphy ABSTRACT: An electronic system for controlling light source intensity in document copying apparatus. Illumination for a photographic process is automatically varied in accordance with relative reflectivity characteristics of documents being advanced through the apparatus. A photoelectric device senses the amount of light energy reflected from such documents and this information is coupled to a circuit adapted to control energization of the illuminating lamps. The coupling circuitry includes an electronic switching device operatively connected to the output of a square wave generator having a duty cycle dynamically adjusted for modulating power to the lamps.

INVENTOR
HAJO A. KOLSHORN
BY Frank A. Seeman
ATTORNEY

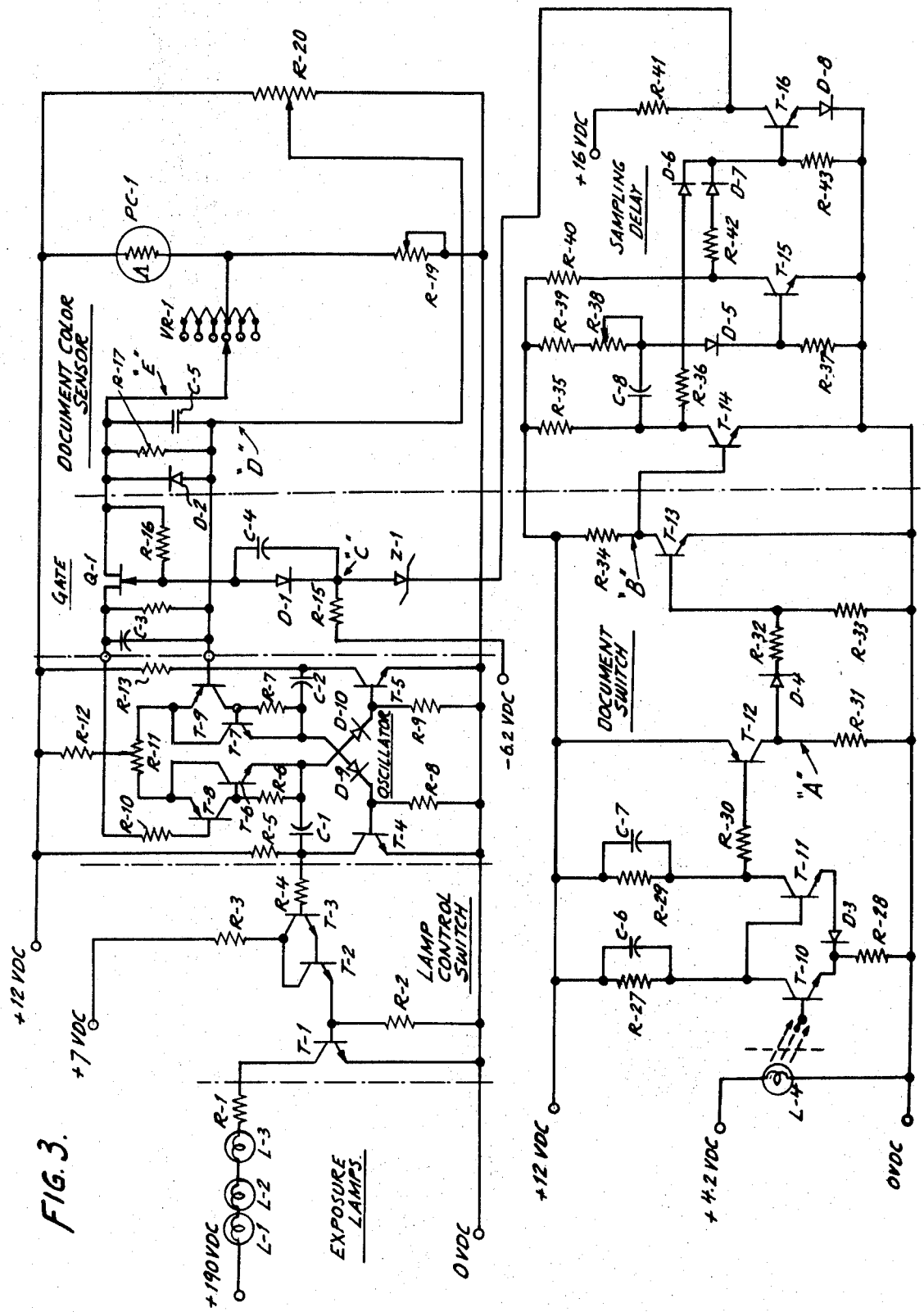

3,609,038

ELECTRONIC CONTROL APPARATUS

BACKGROUND OF THE INVENTION

In present day document copying apparatus of the continuous flow type, a series of documents are sequentially feed at relatively high rates of speed along a predetermined path through a reproduction station, at which it is not uncommon to employ a photographic reduction process for copying original document images. This type of processing provides exposed film subsequently developed for use as the storage media in information retrieval systems, generally referred to as microfilm systems.

In a typical microfilm system, the size of filmed images are usually reduced anywhere from one-tenth to one-fortieth the size of the original documents. Developed film is then stored in any one of several known forms for future reference. Common forms in which microfilm is retained include aperture cards, microfiche and roll film, the selection of which depends on the application involved. The many inherent advantages of employing a microfilm system for information storage include space savings, security, and durability as well as facility of reference, retrieval and reproduction.

Regardless of the above-mentioned advantages, any microfilm system must be capable of retaining image clarity. For example, when a letter size copy of a stored microimage is desired, the filmed copy must be enlarged back to original document size without noticeable loss of the details that were present in the original document. To this end, exposure controls are utilized in microfilm cameras for providing variation in the printing light source intensity for the purpose of maintaining consistency of negative densities of the filmed images in accordance with reflectivity characteristics of the document involved.

There are two general categories of microfilm cameras in which documents are sequentially fed through a photograph station at which exposure control is desirable. One type is referred to as a "rotary" camera, which includes apparatus for feeding documents continuously through the photograph station. The other type is a "planetary" camera, in which documents are usually placed on a copyboard in a random intermittent fashion. Regardless of functional distinctions between these two types of cameras, the reflectivity characteristics of the documents involved can normally be expected to vary. Therefore, to assure clear reproduction of document images, frequent correction of film exposure is necessary to maintain the film density relatively constant.

Thus, to obtain satisfactory reproductions, it becomes necessary to control film exposure automatically in accordance with successively varying document reflectivity characteristics. In the case of a rotary camera, it is further desirable that exposure be continuously controlled as documents are fed sequentially through the photograph station, i.e., it becomes necessary to measure relative reflectivity of each document prior to its arrival at the photograph station, whereby subsequent corrections to printing illumination are synchronized at such time as the document passes through the photograph station.

An object of the present invention is to provide improved film exposure control apparatus for document reproduction equipment.

A further object is to provide an electronic system for automatically and continuously controlling printing light intensity in microfilm cameras in accordance with relative document reflectivity characteristics.

BRIEF DESCRIPTION OF THE INVENTION

The present invention broadly contemplates photographic reproducing apparatus including a transport mechanism for sequentially feeding documents along a predetermined path to a photograph station whereat a camera reproduces document images. A light source provides illumination of the documents. Energization of the light source in accordance with document reflectivity is controlled by a unique circuit arrangement.

More specifically, the control circuitry includes a photoelectric cell for sensing light energy reflected from documents prior to being fed through the photograph station. An electronic switching device is connected in circuit with the light source and a power supply therefor, for selectively gating current flow through the source. The output of a square wave oscillator is coupled to the switching device for alternately biasing the switch to on and off conditions. Variation of the oscillator duty cycle in accordance with light sensed by the photoelectric cell switches the light source on and off to modulate the light level in response to intensity of reflected light sensed by the cell. This feedback arrangement dynamically maintains equilibrium of illumination as a function of document background color and image density.

BRIEF DESCRIPTION OF THE DRAWINGS

FIG. 3 is a schematic wiring diagram of the electronic circuitry employed in the system shown in FIG. 2.

DESCRIPTION OF THE PREFERRED EMBODIMENT

For convenience, the invention will be described hereinbelow as applied to a rotary type microfilm camera in which documents are carried in a continuous and sequential fashion at a relatively high rate of speed through a photograph station to be photographed in sequence onto a roll of microfilm carried by a film transport. It should be understood that without departing from the scope of the invention, the instant apparatus is applicable to most other types of cameras which require automatic and continuous exposure control in response to variations in the reflectivity of documents being sequentially photographed.

Figure 1:
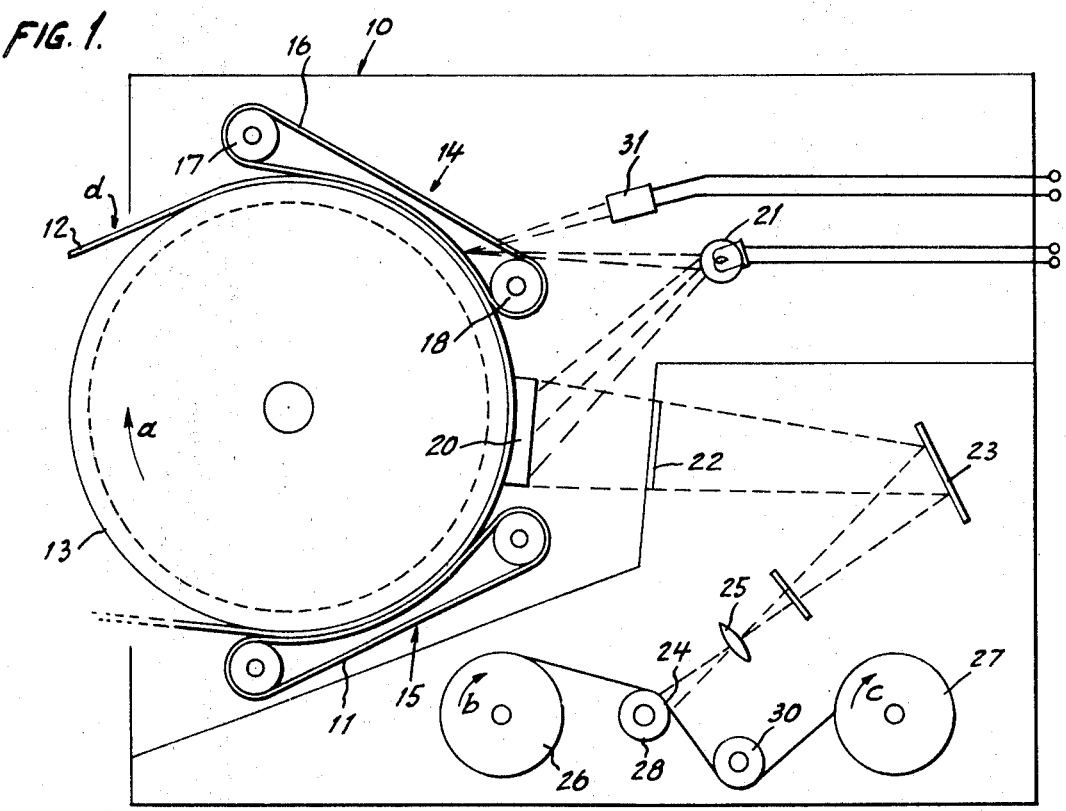
FIG. 1 is a simplified schematic representation, in section, of a typical rotary microfilm camera in which the present invention may be readily embodied.

Now referring to FIG. 1 of the drawings, reference numeral 10 generally designates a rotary microfilm camera casing which is divided by a light shield 11 into two separate compartments. A plurality of documents to be photographed are illustrated in the form of a continuous strip 12 fed over a dark rubber surfaced drive roller 13, the rotational direction of which is indicated by a directional arrow "a."

Idler assemblies 14, 15 are provided for maintaining document strip 12 in driven frictional engagement with drive roller 13. Each such assembly, for example 14, consists of an endless belt 16 looped around two rotatably mounted sheaves 17, 18. The sheaves are adjustably mounted (not shown) for maintaining belt 16 under tension to retain document strip 12 in driven frictional engagement between drive roller 14 and belt 16.

Document strip 12 is carried at a constant speed by drive roller 14 past what is referred to as a photograph station whereat the camera continuously sequentially photographs documents comprising the strip. At such photograph station, strip 12 passes beneath a glass element 20 which covers and defines the photograph station.

A bank of exposure lamps (only one shown in FIG. 1), designated by reference numeral 21, is mounted in position to illuminate the documents for photographing as they move through the photograph station. As each document of strip 12 moves into position to be photographed, the document image is reflected through glass element 20 and a camera aperture 22, provided in light shield 11, onto a mirror 23. The image is then directed by mirror 23 onto a segment of photographic film 24 via lens 25. Film 24 is fed at a predetermined speed for a feed reel 26 to a takeup reel 27, in a direction indicated by arrows "b" and "c," respectively, passing over tensioning rollers 28, 30 deposed at convenient intermediate positions.

Exposure lamps 21 are arranged to project light rays (shown as broken lines) not only onto the photograph station but also to illuminate a predetermined area in advance of the photograph station along the path of document travel. A photoelectric cell 31 (hereinafter referred to as a photocell) is positioned to collect light reflected from the surface of the documents, as they arrive at such advanced illuminated area. If desired, light conductors may be utilized to carry reflected light from the point of measurement at the document surface, termed the "measurement station," to the light-sensitive area of photocell 31.

Since the amount of light reflected by the surface of each document varies as a function of the color and surface condition thereof, the excitation of photocell 31 by such reflected light also varies and accordingly is a measurement of the relative imparted energy to photographic film 24. Such measurement is utilized in the control system shown in block form at FIG. 2, to control exposure of film 24 and thereby maintain consistency of negative density, notwithstanding variations in the color and surface conditions of the documents sequentially photographed thereon.

It should be noted that the same light source, exposure lamps 21, is utilized in the measurement of document reflectivity characteristics as is used in the photographing of documents, thus obviating the necessity to compensate for differences in lamp characteristics as would be the case if separate sources were used. In this regard, it may be convenient to utilize only one lamp in the bank for the purpose of reflecting light to photocell 31 from documents at a specific lateral region of the measurement station.

For proper exposure control, the distance between the measurement station and the photographic station must be accurately derived. In making such distance determination consideration must be given to desired speed of document travel as well as the speed with which exposure correction is effected. In one tested embodiment of the exposure control illustrated in the circuitry of FIGS. 2 and 3, and involving a rotary microfilm camera operating at a relative high rate of speed, satisfactory exposure control was obtained with photocell 31 excited by light collected from the document surface at a point approximately 1½ inches from the photograph station. The exact determination of this design distance can be derived by adjustments to control circuitry elements as will become evident from the description hereinbelow.

Figure 2:
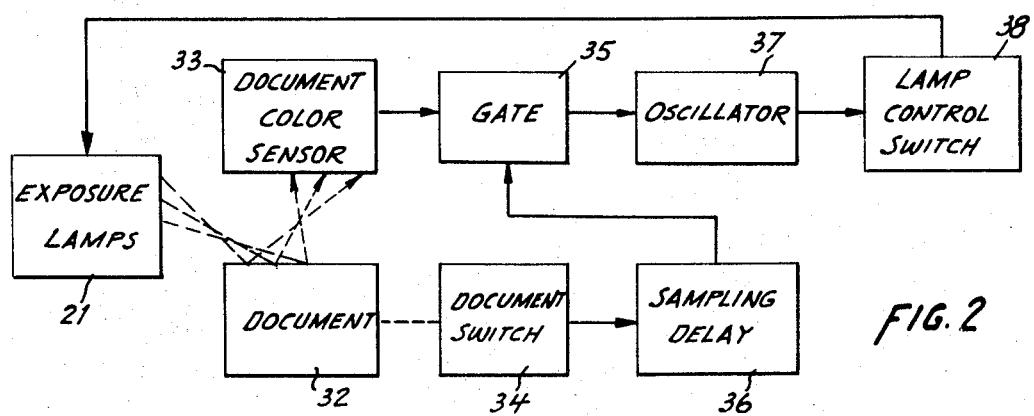
FIG. 2 is a block diagram illustrating a control system adapted for use in a camera of the type shown in FIG. 1.

Now turning to FIG. 2, light emitted from exposure lamps 21 is reflected from a document 32 (shown diagrammatically as a block) the background color and surface condition of which determines the intensity of light sensed by a document color sensor 33. Prior to color sensing, the physical presence of a document is sensed by a document switch 34, which is coupled to a gate 35 via a sampling delay circuit 36. It should be noted that sensor 33 is referred to as a color sensor in that the background color, the average image density as well as the surface condition of the document all contribute to the reflectivity characteristics that determine the intensity of light imparted. Accordingly, document color information becomes available in the form of a signal at sensor 33, which signal is gated to an oscillator 37 having an output that varies to dynamically control exposure lamps 21 via a lamp control switch circuit 38. The output signal from document switch 34 is delayed to synchronize the gating function with the color information sensed from the same document subsequent to physical sensing of the document at a predetermined point along its path through the camera. Each of the blocks shown in FIG. 2 correspond to a designated portion of FIG. 3 schematic diagram of the circuitry for a preferred embodiment of the present invention.

For clarity, the following detailed description will be set forth by means of a discussion of actual circuitry operation initiated by the occurrence of a document presented for reproduction. As an aid to the understanding of particular circuits involved, typical values of many of the components are set forth in the chart below. These values are representative of those used in a working embodiment and would of course vary to a certain degree in accordance with characteristics of related components and design aspects of the overall system. All resistors are rated at one-half watt unless otherwise noted.

EXPOSURE LAMP CIRCUIT

| | |
|---|---|
| R-1 | 25 ohms, 50 watts |

LAMP CONTROL CIRCUIT

| | |
|---|---|
| R-2 | 470 ohms |
| R-3 | 10 ohms, 5 watts |
| R-4 | 10 K. ohms |

OSCILLATOR

| | |
|---|---|
| R-5, R-13 | 1 K. ohms |
| R-6, R-7 | 100 K. ohms |
| R-8, R-9, R-10 | 10 K. ohms |
| R-11 | 500 ohms (variable center tap) |
| R-12 | 2.2 K. ohms |
| C-1, C-2 | 0.047 mf. |

GATE CIRCUIT

| | |
|---|---|
| R-14 | 220 K. ohms |
| R-15 | 100 K. ohms |
| R-16 | 1 K. ohms |
| C-3 | 5 mf. |
| C-4 | 100 mmf. |

DOCUMENT COLOR SENSOR CIRCUIT

| | |
|---|---|
| R-17 | 1 K. ohms |
| C-5 | 0.22 mf. |
| R-19 | 20 K. ohms (variable) |
| R-20 | 1 K. ohms (center tap) |

DOCUMENT SWITCH

| | |
|---|---|
| R-27 | 4.7 K. ohms |
| R-28 | 27 ohms |
| R-29 | 2.2 K. ohms |
| R-30, R-33 | 100 K. ohms |
| R-31, R-32, R-34 | 10 K. ohms |
| C-6 | 0.0047 mf. |
| C-7 | 0.01 mf. |

SAMPLING DELAY

| | |
|---|---|
| R-35, R-41 | 10 K. ohms |
| R-36, R-37, R-43 | 100 K. ohms |
| R-38 | 100 K. ohms (variable) |
| R-39 | 82 K. ohms |
| R-40, R-42 | 4.7 K. ohms |

In operation, a document is introduced as illustrated by position "d" along strip 12 in FIG. 1. The leading edge of such document trips a conventional mechanical flag mechanism (not shown) such that the light path between lamp L-4 (FIG. 3) and phototransistor T-10 is open until the trailing edge of said document deactuates the trip mechanism. The time period during which the light path is not interrupted is referred to as a document interval.

During such document interval the Schmitt trigger circuit, including diode phototransistor T-10 transistor T-11, resistors R-27, R-28 and R-29 and diode D-3, will be switched such that T-10 is conducting and T-11 is not conducting, hence transistor T 12 and inverter transistor T-13 are not conducting.

Figure 4:
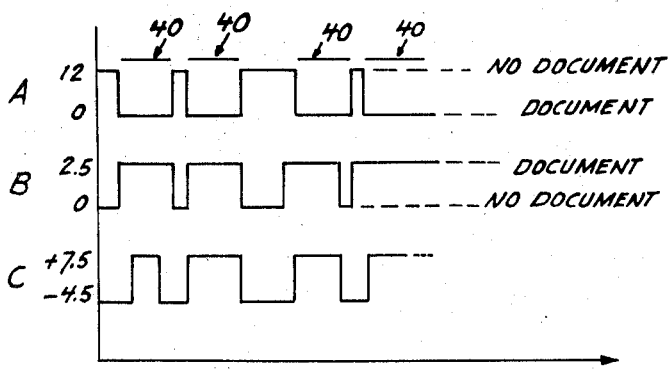
FIG. 4 shows representative waveforms that occur at selected points in the system.

For a succession of document intervals of different periods, corresponding to varying length documents indicated by a series of varying length dashes 40 in FIG. 4, the voltages at points A and B (FIG. 3) will alternate between 0 and 12, and 0 and 2.5, respectively, as shown by waveforms A and B of FIG. 4. Hence, the leading edge of a document, upon arrival at the trip mechanism, switches the collector of transistor T-13 (point B) from about 0 volts to about 2.5 volts. This turns on transistor T-14 to start the sampling cycle.

The voltage represented by waveform A, the inverse of waveform B, may also be used elsewhere in the apparatus for synchronizing film movement and shutter opening, as well as other auxiliary functions.

Transistor T-14 together with time delay circuit comprising transistor T-15, capacitor C-8, and resistors R-38 and R-39, switches transistor T-16 in such a manner that the voltage at the gate of transistor Q-1 (point "C," FIG. 3) corresponds to waveform C FIG. 4. In the present embodiment, transistor T-16 must be conducting for "C" to be negative, i.e., the "-Sampling Delay" circuit is in a hold condition.

Between document intervals, forward bias for T-16 is supplied through resistors R-35, R-36 and diode D-6 and thus transistor T-16 remains in a conducting state. On arrival of the leading edge of the document at the trip mechanism, this forward bias is removed. However, simultaneously the normally conducting transistor T-15 is turned off due to the left-hand side of capacitor C-8 being grounded. This allows bias to be supplied to transistor T-16 through resistors R-40, R-42 and diode D-7 until such time as capacitor C-8 is recharged through resistors R-38 and R-39 to a voltage that turns transistor T-15 on, at which time (typically a 40 msec. delay) transistor T-16 will go off and point C (FIG. 3) will go several volts positive, sufficient to make transistor Q-1 conductive for all output conditions of a bridge circuit comprising photocell PC-1, and resistors R-19 and R-20, discussed below. This closes a feedback loop in which the automatic exposure control system dynamically samples document color characteristics prior to arrival at the photographic station.

Once the training edge of the document leaves the trip mechanism, transistor T-14 turns off immediately, as well as transistors T-16 and Q-1. This opens the feedback loop and the time constant of holding capacitor C-3 and related circuitry is such that the light output from the exposure lamps remains constant a sufficient amount of time to enable the last portion of the document to pass through the photographic station. In this manner the photocell does not sense the dark, nonreflective surface of the transport and therefore only small corrections of the initial light level are required for the next document interval.

The delay discussed above is necessary to compensate for the relatively slow response of the incandescent exposure light source and therefore a considerable improvement is realized over many previous methods which use mechanical arrangements in an attempt to accommodate for the high speed of document travel in modern cameras. It should be noted, however, that the delay may be adjusted to be employed also with other light sources such as the fluorescent type.

Now turning again to FIG. 3, the Exposure Lamp portion is coupled to the lamp control switch comprising transistor T-1 and associated driver transistors T-2 and T-3, which in turn is coupled to the oscillator portion, comprising a multivibrator (transistors T-4 and T-5) controlled by a differential amplifier (transistors T-8, T-6 and T-7, T-9). The aforementioned sample hold circuit comprising capacitor C-3, resistor R-14, and transistor Q-1 couples the oscillator to the photocell bridge circuit comprising photocell PC-1, and resistors R-19 and R-20.

Under conditions where capacitor C-3 is discharged (several seconds after passage of the last document) by means of resistor R-14, and transistor Q-1 is nonconducting, the currents in the differential amplifier, i.e., the currents through transistors T-6 and T-7 to their respective timing capacitors C-1 and C-2, are balanced and the multivibrator, comprising transistors T-4 and T-5 in conjunction with the mentioned timing capacitors, will oscillate at approximately 1 kHz. The oscillator output is taken off the collector transistor T-4 and after suitable amplification via transistors T-3 and T-2, a square wave signal is used to switch the lamp current through transistor T-1. Due to the high switching rate and the long decay time constant of the lamps (about 30 msec.), ripple in the light output of the lamps is obviated and hence "banding" on the photographic film is eliminated. "Banding" occurs on photographic film when there is a noticeable ripple in the energy output of the light source whereby the width of the aperture in conjunction with the rate of film travel is such that bands of varying density appear on developed film perpendicular to the path of travel.

With transistor Q-1 conducting during the sampling period, the respective positive or negative voltage between the bridge outputs, E and D, (FIG. 3) will charge capacitor C-3 accordingly and increase the current in either transistor T-6 or transistor T-7, depending on the polarity. The overall period (frequency) of the oscillator will remain essentially constant due to balancing resistor R-12. When current changes in one transistor a change of opposite polarity will occur in the other transistor, thus changing the duty cycle of the lamp current. Therefore, the light output, the reflected light from the document, and the photocell resistance are varied until the feedback circuit is balanced with respect to the reference voltage at resistor R-20. Proper selection of the photocell and appropriate optical filtering (not shown) will produce a color response matching that of the photographic film.

Many advantages are explicitly or implicitly set forth in the above description of an improved photographic exposure control device. For example, the present system is adapted to accommodate the slow response time of incandescent lamps; however, it is not intended to be limited for use only with such lamps. Further, the banding phenomenon discussed above is effectively eliminated due to the unique implementation of a 1,000 Hz. energizing signal as opposed to the normal 120 Hz. source which produces a ripple that is not resolvable in the aperture slit, i.e., regardless of filtering techniques employed a variation in light energy results, causing bands of varying densities on the developed film. Furthermore, the nature of the electronic system involved facilitates its adaptability for ready programming, interfacing and/or other related automatic functions, by virtue of the various intermediate signals available.

Although a specific embodiment of the invention has been illustrated and described in detail by way of example, it is to be understood that the invention is not limited thereto. Various changes may be made in the design and arrangement of parts without departing from the spirit and scope of the invention, as will be readily understood by those skilled in the art.

I claim:
1. A photographic reproducing device comprising
  A. transport means for sequentially feeding documents along a predetermined path to a photograph station.
  B. camera means associated with said photograph station for photographing said documents upon arrival at said photograph station,
  C. a light source for illuminating said documents prior to arrival at and during travel through said photograph station,

D. means for energizing said light source,
E. Means for controlling said energizing means in accordance with the intensity of light energy reflected from said documents, said control means comprising,
   a. a photoelectric cell for sensing light reflected from said documents prior to travel through said photograph station,
   b. electronic switching means connected in circuit with said energizing means and said light source for selectively permitting appropriate current flow through said source,
   c. oscillator means connected to said switching means for alternately biasing said switching means to on and off conditions, and
   d. means coupling said cell to said oscillator for varying the duty cycle of said oscillator in response to the light sensed by said cell.

2. A photographic reproducing device as set forth in claim 1 wherein said oscillator means comprise an electronic circuit having input and output terminals, said input terminals coupled to said photoelectric cell, said output terminals connected to said switching means, and said circuit adapted to develop potential at said output terminals in the form of a square wave for which the duty cycle varies in accordance with the signal at said input terminals, which signal varies in response to the intensity of the light impinging on said photoelectric cell.

3. A photographic reproducing device as set forth in claim 2 wherein said oscillator operates at a frequency of 1,000 Hertz.

4. A photographic reproducing device as set forth in claim 2 wherein said electronic switching means comprise at least one transistor having base, collector and emitter terminals, said base and collector terminals connected in series with said light source and said energizing means, and means for coupling said e base terminal to said oscillator output to effect switching of said one transistor from off to saturation in response to the high and low portions of said square wave output.

5. A photographic reproducing device as set forth in claim 2 wherein said photoelectric cell comprises one leg of an impedance bridge circuit, the output of which is coupled to said input terminals of said oscillator.

6. A photographic reproducing device as set forth in claim 5 wherein said electronic switching means comprise at least one transistor having base, collector and emitter terminals, said base and collector terminals connected in series with said light source and said energizing means, and means for coupling said base terminal to said oscillator output to effect switching of said one transistor from off to saturation in response to the high and low portions of said square wave output.

7. A photographic reproducing device as set forth in claim 2 wherein said electronic circuit comprises a multivibrator, and a differential amplifier operatively connected between the multivibrator and said input terminals to regulate said multivibrator in accordance with the relative potential thereat.

8. A photographic reproducing device as set forth in claim 7 wherein said photoelectric cell comprises one leg of an impedance bridge circuit having output terminals connected to said differential amplifier via said oscillator input terminals for varying the input to said multivibrator to effectively change the duty cycle of the oscillator in response to the variation of sensed light, whereby the duty cycle is dynamically adjusted until an equilibrium condition exists as a function or relative document reflectivity.

9. A photographic reproducing device as set forth in claim 5 and wherein said bridge circuit includes two input terminals, one of which is connected to a corresponding input terminal of said oscillator, the other of which is connected to its corresponding input terminal of said oscillator by gating means.

10. A photographic reproducing device as set forth in claim 9 and further including a time delay circuit and an electronic document switch for sensing the leading and trailing edge of said documents being fed to said photographic station, and wherein said gating means comprise a switch responsive to a signal originating at said electronic document switch and delayed by said time delay for a predetermined time interval corresponding to a known excursion of document travel prior to entry into said photograph station.